(12) United States Patent
Lee et al.

(10) Patent No.: US 11,735,371 B2
(45) Date of Patent: *Aug. 22, 2023

(54) MULTILAYER CERAMIC CAPACITOR (71) Applicant: SAMSUNG ELECTRO-MECHANICS CO., LTD., Suwon-si (KR)

(72) Inventors: Taek Jung Lee, Suwon-si (KR); Min Gon Lee, Suwon-si (KR); Jin Man Jung, Suwon-si (KR); Ji Hong Jo, Suwon-si (KR); Jin Kyung Joo, Suwon-si (KR); Do Heung Na, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,968

(22) Filed: Feb. 8, 2022

(65) Prior Publication Data

US 2022/0165504 A1 May 26, 2022

Related U.S. Application Data

(63) Continuation of application No. 16/808,674, filed on Mar. 4, 2020, now Pat. No. 11,282,648.

(30) Foreign Application Priority Data

Jul. 5, 2019 (KR) .......................... 10-2019-0081138

(51) Int. Cl.
*H01G 4/30* (2006.01)
*H01G 2/02* (2006.01)
(Continued)

(52) U.S. Cl.
CPC .................. *H01G 4/30* (2013.01); *H01G 2/02* (2013.01); *H01G 4/012* (2013.01); *H01G 4/1218* (2013.01)

(58) Field of Classification Search
CPC ............ H01G 4/35; H01G 4/30; H01G 4/012; H01G 4/005; H01G 4/1218; H01G 2/02
(Continued)

(56) References Cited

U.S. PATENT DOCUMENTS 5,973,929 A * 10/1999 Arakawa ................ H05K 1/162
361/302
8,564,931 B2 10/2013 Nishisaka et al.
(Continued)

FOREIGN PATENT DOCUMENTS

| CN | 102290235 A | 12/2011 |
| CN | 104240950 A | 12/2014 |

(Continued)

OTHER PUBLICATIONS

Chinese Office Action dated Jun. 27, 2022 issued in Chinese Patent Application No. 202010419214.8 (with English translation).
(Continued)

*Primary Examiner* — Arun Ramaswamy
(74) *Attorney, Agent, or Firm* — Morgan, Lewis & Bockius LLP (57) ABSTRACT

A multilayer ceramic capacitor includes a body including dielectric layers and first and second internal electrodes disposed with respective dielectric layers interposed therebetween to be point-symmetrical to each other, first and second connection electrodes penetrating through the body in a direction perpendicular to the dielectric layer, and connected to the first internal electrode, third and fourth connection electrodes penetrating through the body in the direction perpendicular to the dielectric layer, and connected (Continued)

to the second internal electrode, first and second external electrodes disposed on both external surfaces of the body and connected to the first and second connection electrodes, and third and fourth external electrodes spaced apart from the first and second external electrodes and connected to the third and fourth connection electrodes. Each of the first and second internal electrodes includes an electrode-unformed region.

19 Claims, 4 Drawing Sheets

(51) Int. Cl.
  *H01G 4/012*  (2006.01)
  *H01G 4/12*  (2006.01)
(58) Field of Classification Search
  USPC ... 361/303, 304, 306.3, 301.4, 321.2, 321.3, 361/321.4
  See application file for complete search history.

(56) References Cited

U.S. PATENT DOCUMENTS

| | | | |
|---|---|---|---|
| 10,015,884 B2 | 7/2018 | Lee et al. | |
| 10,325,725 B2 | 6/2019 | Seo et al. | |
| 2002/0158307 A1* | 10/2002 | Honda | H01G 4/232 257/532 |
| 2005/0122662 A1* | 6/2005 | Hayashi | H01G 4/12 361/306.3 |
| 2011/0290542 A1 | 12/2011 | Nishisaka et al. | |
| 2013/0088810 A1 | 4/2013 | Yang et al. | |
| 2014/0104750 A1* | 4/2014 | Ahn | H01G 4/30 361/306.3 |
| 2014/0182911 A1 | 7/2014 | Lee et al. | |
| 2014/0203892 A1* | 7/2014 | Ehara | H01F 17/00 333/185 |
| 2014/0367152 A1 | 12/2014 | Lee et al. | |
| 2015/0124371 A1* | 5/2015 | Park | H05K 1/162 361/301.4 |
| 2016/0093438 A1* | 3/2016 | Sasabayashi | H01G 4/12 361/301.4 |
| 2018/0027656 A1* | 1/2018 | Jung | H01G 4/30 174/260 |
| 2018/0068796 A1* | 3/2018 | Seo | H05K 1/111 |
| 2018/0122575 A1 | 5/2018 | Jang et al. | |
| 2018/0233287 A1 | 8/2018 | Seo et al. | |
| 2018/0342351 A1* | 11/2018 | Lee | H01G 4/308 |
| 2019/0074138 A1 | 3/2019 | Song et al. | |
| 2021/0005384 A1 | 1/2021 | Lee et al. | |

FOREIGN PATENT DOCUMENTS

| | | |
|---|---|---|
| CN | 107644735 A | 1/2018 |
| CN | 109473279 A | 3/2019 |
| CN | 112185700 A | 1/2021 |
| CN | 112185702 A | 1/2021 |
| JP | H08-17675 A | 1/1996 |
| JP | 2004-095685 A | 3/2004 |
| JP | 2010-123613 A | 6/2010 |
| JP | 2012-9813 A | 1/2012 |
| JP | 2014-187289 A | 10/2014 |
| JP | 2014-131006 A | 7/2017 |
| JP | 2018-129499 A | 8/2018 |
| KR | 10-2015-0052510 A | 5/2015 |
| KR | 10-2018-0009997 A | 1/2018 |
| KR | 10-2018-0027253 A | 3/2018 |
| KR | 10-2018-0047888 A | 5/2018 |

OTHER PUBLICATIONS

U.S. Notice of Allowance dated Nov. 23, 2021 issued in U.S. Appl. No. 16/808,674.
U.S. Non-Final Office Action dated Sep. 16, 2021 issued in U.S. Appl. No. 16/808,674.
Korean Office Action dated Apr. 27, 2023 issued in Korean Patent Application No. 10-2019-0081138 (with English translation).
Japanese Office Action dated Jun. 27, 2023 issued in Japanese Patent Application No. 2020-040248 (with English translation).

* cited by examiner

MULTILAYER CERAMIC CAPACITOR

CROSS-REFERENCE TO RELATED APPLICATION(S)

This application is a continuation of U.S. patent application Ser. No. 16/808,674, filed on Mar. 4, 2020, which claims benefit of priority to Korean Patent Application No. 10-2019-0081138 filed on Jul. 5, 2019, the disclosures of which are incorporated herein by reference in their entireties.

TECHNICAL FIELD

The present disclosure relates to a multilayer ceramic capacitor.

BACKGROUND

Recently, the use of electronic devices using a multilayer ceramic capacitor (MLCC) has rapidly increased. In particular, as the fifth generation (5G) era has come about, smartphones require a greater number of capacitors and higher capacitance thereof. On the other hand, due to technical miniaturization of set products, a mounting area of passive components such as an MLCC and an inductor has been decreased, and thus, miniaturization and thinning of the passive components are further required. Accordingly, there is a proposed method in which a multilayer ceramic capacitor and an inductor are packaged with an IC and an AP, embedded in a substrate, or mounted on a lower end portion of an AP in a land side capacitor (LSC) type manner to increase the degree of mounting freedom.

In this case, not only a reduction in mounting area but also a reduction in equivalent series inductance (ESL), generated in a substrate, may be achieved. Accordingly, there is increasing demand for a multilayer ceramic capacitor product having a low thickness.

A via type capacitor is a structure using a through-hole unlike a general MLCC. This is accomplished by forming a through-hole in a body in which a cover layer is disposed on upper and lower portions and an active layer forming a capacitance is formed therein, and then the via electrode is filled and electrically connected.

Unlike a common MLCC, a via-type capacitor has a structure using a through-hole. In the via-type capacitor, an electrical connection is achieved by forming a through-hole in a body, in which cover layers are disposed on an upper portion and a lower portion and an active layer forming capacitance is disposed, and filling a via electrode.

In such via-type capacitor, equivalent series inductance (ESL) and equivalent series resistance (ESR) may be affected and capacitance may be reduced due to presence of a via.

SUMMARY

An aspect of the present disclosure is to provide a multilayer ceramic capacitor which may improve equivalent series inductance (ESL) due to a mutual inductance cancellation effect.

Another aspect of the present disclosure is to provide a multilayer ceramic capacitor having improved capacitance, as compared with an internal via structure.

Another aspect of the present disclosure is to provide a multilayer ceramic capacitor having an improved breakdown voltage (BDV).

According to an aspect of the present disclosure, a multilayer ceramic capacitor include a body including dielectric layers and first and second internal electrodes disposed with respective dielectric layers interposed therebetween to be point-symmetrical to each other, first and second connection electrodes penetrating through the body in a direction, perpendicular to the dielectric layer, and connected to the first internal electrode, third and fourth connection electrodes penetrating through the body in the direction, perpendicular to the dielectric layer, and connected to the second internal electrode, first and second external electrodes disposed on both external surfaces of the body and connected to the first and second connection electrodes, and third and fourth external electrodes spaced apart from the first and second external electrodes and connected to the third and fourth connection electrodes. Each of the first and second internal electrodes includes an electrode-unformed region.

According to an aspect of the present disclosure, a multilayer ceramic capacitor include a body including dielectric layers and first and second internal electrodes disposed with respective dielectric layers interposed therebetween; first and second connection electrodes penetrating through the body in a direction perpendicular to the dielectric layer, and connected to the first internal electrode; third and fourth connection electrodes penetrating through the body in the direction perpendicular to the dielectric layer, and connected to the second internal electrode; a first external electrode disposed on one external surface of the body and connected to the first internal electrode through the first and second connection electrodes; and a third external electrode disposed on the one external surface of the body and connected to the second internal electrode through the third and fourth connection electrodes. The second internal electrode has first and second via holes in which the first and second connection electrodes are respectively disposed, and the first internal electrode has third and fourth via holes in which the third and fourth connection electrodes are respectively disposed.

A ratio of a diameter of one of the first to fourth connection electrodes to a distance between the first via hole and the third via hole or a distance between the second via hole and the fourth via hole is 0.375 or more and 0.52 or less.

A ratio of a distance between the first and second connection electrodes or a distance between the third and fourth connection electrodes to a distance between the first via hole and the third via hole or a distance between the second via hole and the fourth via hole is 2.08 or more and 4.7 or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments in the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

In the drawings, an X direction may be defined as a first direction, an L direction, or a length direction, a Y direction may be defined as a second direction, a W direction, or a width direction, and a Z direction defined as a third direction, a T direction, or a thickness direction.

Hereinafter, a multilayer ceramic capacitor according to an example embodiment in the present disclosure will be described in detail with reference to FIGS. 1 to 4.

A multilayer ceramic capacitor 100 according to an embodiment includes a body 210 including dielectric layers 211 and first and second internal electrodes 221 and 222, disposed with respective dielectric layers 211 interposed therebetween to be point-symmetrical to each other, first and second connection electrodes 231 and 234 penetrating through the body 210 in a direction perpendicular to the dielectric layer 211 to be connected to the first internal electrode 221, third and fourth connection electrodes 232 and 233 penetrating through the body 210 in the direction perpendicular to the dielectric layer 211 to be connected to the second internal electrode 222, first and second external electrodes 241 and 244 disposed on both external surfaces of the body 210 and connected to the first and second connection electrodes 231 and 234, and third and fourth external electrodes 242 and 243 spaced apart from the first and second external electrodes 241 and 244 and connected to the third and fourth connection electrodes 232 and 233. The first and second internal electrodes 221 and 222 may include electrode-unformed regions 221a and 222a, respectively. Each of the electrode-unformed regions 221a and 222a may be a through-hole in a respective one of the first and second internal electrodes 221 and 222. The electrode-unformed regions 221a and 222a may be filled with a material of the dielectric layers 211.

Figure 1:
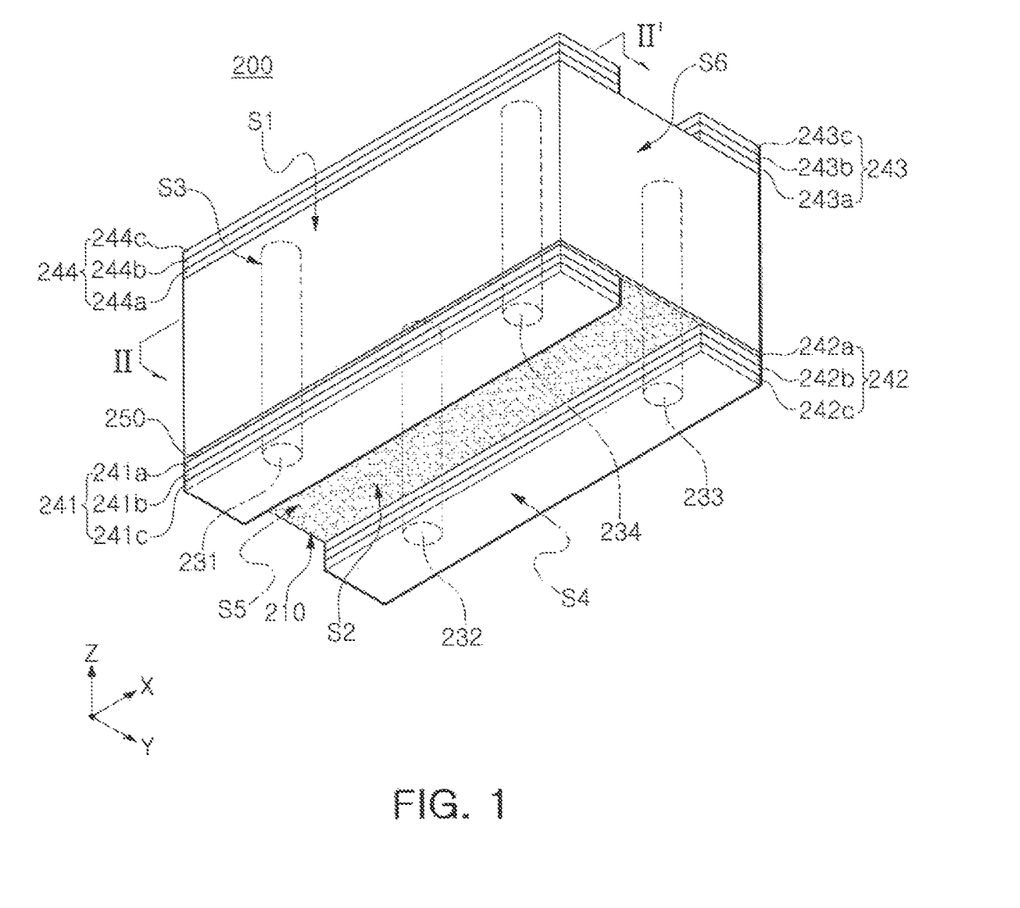
FIG. 1 is a schematic perspective view of a multilayer ceramic capacitor according to an embodiment in the present disclosure.

In the body 210, the dielectric layers 211 and the internal electrodes 221 and 222 are alternately laminated. A detailed shape of the body 210 is not limited, but the body 210 may have a hexahedral shape, as illustrated in the drawing, or a shape similar to the hexahedral shape. The body 210 may have a substantially hexahedral shape, although it is not a complete hexahedral shape, due to shrinkage of ceramic powder particles during a sintering process.

The body 210 may have the first and second surfaces S1 and S2 opposing each other in a thickness direction (a Z direction), the third and fourth surfaces S3 and S4, connected to the first and second surfaces S1 and S2, opposing each other in a width direction (a Y direction), and the fifth and sixth surfaces S5 and S6, connected to the first and second surfaces S1 and S2 and to the third and fourth surfaces S3 and S4, opposing each other in a length direction (an X direction). In this case, a surface selected among the first, second, third, and fourth surfaces S1, S2, S3, and S4 may be a mounting surface. In one example, the first and second connection electrodes 231 and 234 may be arranged in the length direction (the X direction), the third and fourth connection electrodes 232 and 233 may be arranged in the length direction (the X direction), the first and third connection electrodes 231 and 232 may be arranged in the width direction (the Y direction), and the second and fourth connection electrodes 234 and 233 may be arranged in the width direction (the Y direction). The length direction (the X direction) and the width direction (the Y direction) may be perpendicular to, substantially perpendicular to, each other. The term, "substantially," reflects consideration of recognizable process errors which may occur during manufacturing or measurement.

The plurality of dielectric layers 211, constituting the body 210, may be in a sintered state, and adjacent dielectric layers 211 may be integrated with each other so that boundaries therebetween are not readily apparent without using a scanning electron microscope (SEM).

According to an example embodiment, a raw material of the dielectric layer 211 is not limited as long as a sufficient capacitance can be obtained. For example, the raw material of the dielectric layer 211 may be a barium titanate-based material, a lead composite perovskite-based material, a strontium titanate-based material, or the like. The barium titanate-based material may include $BaTiO_3$-based ceramic powder particles. The ceramic powder particles may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, prepared by partially employing calcium (Ca), zirconium (Zr), and the like. Various ceramic additives, organic solvents, plasticizers, binders, dispersants, and the like, may be added to the powder particles such as barium titanate ($BaTiO_3$), or the like, according to the object of the present disclosure.

Figure 2:
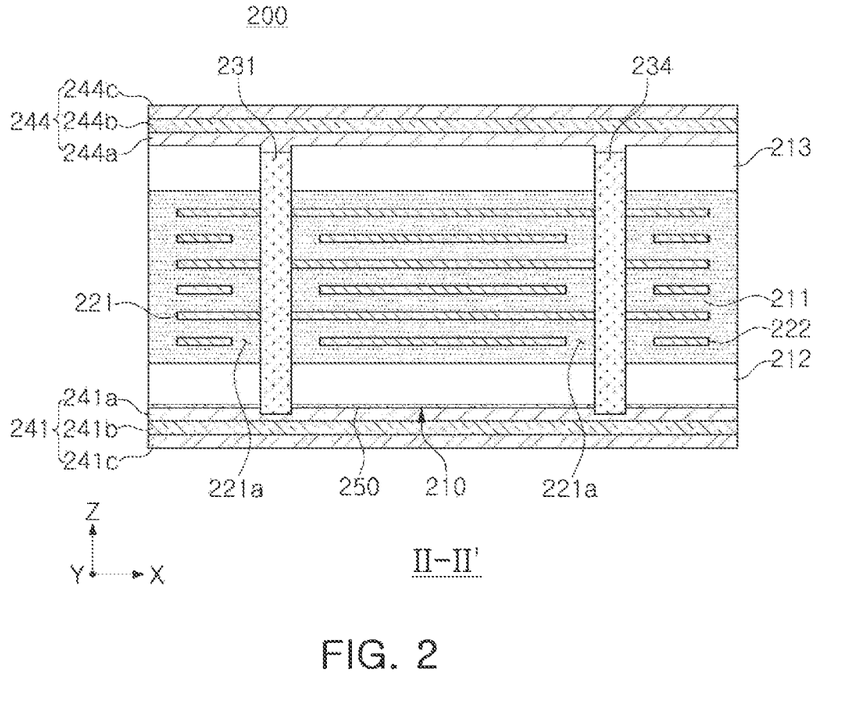
FIG. 2 is a cross-sectional view taken along line II-II' of FIG. 1.

First and second cover portions 212 and 213, each having a predetermined thickness, may be disposed above a lowermost internal electrode and below an uppermost internal electrode of the body 210, respectively. The first and second cover portions 212 and 213 may have the same composition as the dielectric layer 211, and may be formed by laminating at least one dielectric layer, not including an internal electrode, above the uppermost internal electrode and below the lowermost internal electrode of the body 110, respectively.

In an example, an identification portion 250 may be disposed on the first cover portion 212 or the second cover portion 213, as necessary. The identification portion 250 may be formed on one of the first cover layer 212 and the second cover layer 213 and may serve to identify the upper and lower portions of the body 210 using a difference in brightness or color. The identification portion 250 may be a dielectric layer in which a single ceramic green sheet is sintered or a plurality of ceramic green sheets are laminated, and may be included in the first cover portion 212 or the second cover portion 213. For example, the identification portion 250 may be formed on only one of the first cover layer 212 and the second cover layer 213 so as to identify the upper and lower portions of the body 210 using a difference in brightness or color.

A method of allowing the identification portion 250 to have brightness or color, different from brightness or color of the first cover portion 212 or the second cover portion 213, is not limited. The identification portion 250 may be formed using ceramics particles, having sizes different from sizes of the ceramic particles included in the body 210, or may be formed by adding an oxide of at least one metal selected from Ni, Mn, Cr, Mg, Y, and V, $BaSiO_3$, or $CaSiO_3$ to a ceramic material. However, a material of the identification portion 250 is not limited thereto. When the identification portion 250 is disposed, the upper and lower portions of the body 210 may be distinguished from each other and a direction of a protrusion, from which the above-described connection electrodes protrudes, may be confirmed. Thus, the multilayer ceramic capacitor according to the present disclosure may be mounted on a substrate by selecting a direction having better adhesive strength.

In an example, the body 210 may have a thickness of 100 μm or less. The thickness of the body 210 may be a vertical distance between the first surface S1 and the second surface S2, and a lower limit thereof is not limited but may be, for example, 5 μm or more. Since the body 210 may a thickness of 100 μm or less, the multilayer ceramic capacitor according to the present disclosure may be applied to a substrate-embedded multilayer ceramic capacitor and/or a capacitor mounted on a lower end portion of an AP in an LSC-type manner.

Figure 3A:
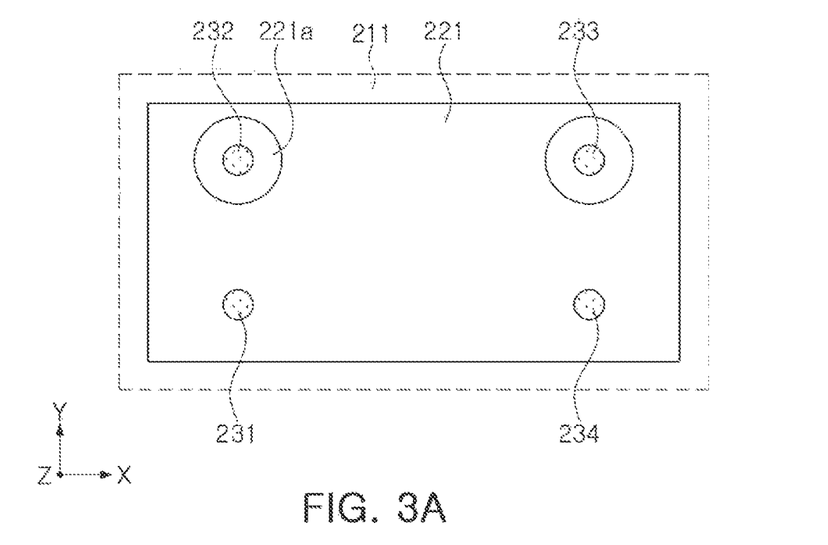
FIG. 3A is a cross-sectional view in X and Y directions of FIG. 1, in which a first internal electrode is observed.
Figure 3B:
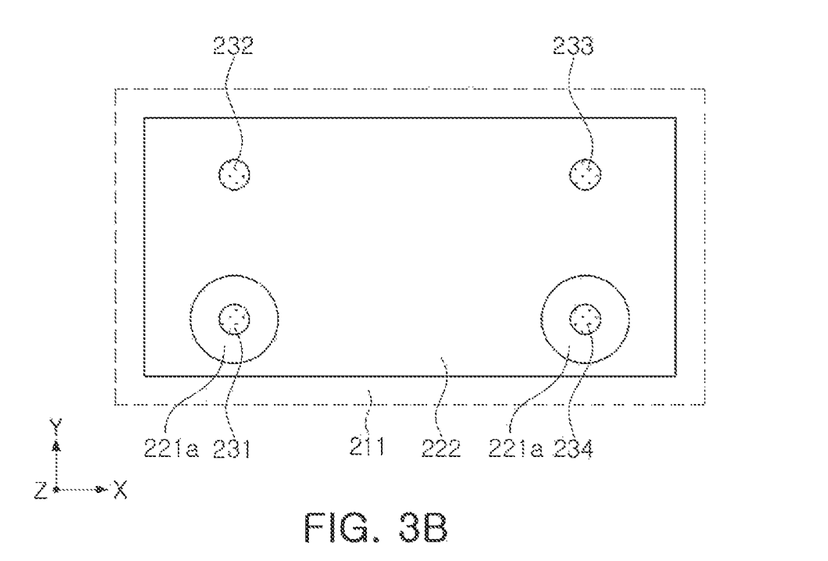
FIG. 3B is a cross-sectional view in X and Y directions of FIG. 1, in which a second internal electrode is observed.

FIGS. 3A and 3B are cross-sectional views illustrating shapes of the first internal electrode 221 and the second internal electrode 222. Referring to FIGS. 3A and 3B, the first and second internal electrodes 221 and 222 may be point-symmetrical to each other, which may refer to point symmetry established between the first and second internal electrodes 221 and 2221 on the basis of centerlines of the first and second internal electrodes 221 and 222 when virtual lines are drawn on four corners of the internal electrodes 221 and 222. As described above, since the first internal electrode 221 and the second internal electrode 222 are point-symmetrical to each other, a mutual inductance cancellation effect may be achieved to improve equivalent series inductance (ESL) of the multilayer ceramic capacitor.

In an example, internal electrodes may include first and second inner electrodes 221 and 222, each having a rectangular shape. In this case, the first internal electrode 221 may have third and fourth via holes, and the second internal electrode 222 may have first and second via holes. The via hole may refer to a hole, penetrating through the first and second internal electrodes 221 and 222, and may serve to respectively connect the first and second internal electrodes 221 and 222 to only external electrodes having polarities opposite to each other.

For example, the first and second connection electrodes 231 and 234 may be spaced apart from the second internal electrode 222 by the first and second via holes, and the third and fourth connection electrodes 232 and 233 may be spaced apart from the first internal electrode 221 by the third and fourth via holes. The first and second connection electrodes 231 and 234 may be disposed to penetrate through the first and second via holes of the second internal electrode 222, such that the first and second connection electrodes 231 and 234 may be electrically insulated from the second internal electrode 222. In addition, the third and fourth connection electrodes 232 and 233 may be disposed to penetrate through the third and fourth via holes of the first internal electrode 221, such that the third and fourth connection electrodes 232 and 233 may be electrically insulated from the first internal electrode 222.

The first internal electrodes 221 may be connected to the first and second external electrodes 241 and 244 by the first and second connection electrodes 231 and 234, and the second internal electrodes 222 may be connected to the third and fourth external electrodes 242 and 243 by the third and fourth connection electrodes 232 and 233. As such, an area, in which the first and second internal electrodes 221 and 222 overlap each other with the dielectric layer 211 interposed therebetween, may significantly increase. Thus, capacitance of the multilayer ceramic capacitor 200 may be significantly increased.

The first and second internal electrodes 221 and 222 may include nickel (Ni) in a highest content, but a material of the first and second internal electrodes 221 and 222 is not limited thereto. For example, the first and second internal electrodes 221 and 222 may be formed using a conductive paste including at least one of silver (Ag), palladium (Pd), gold (Au), platinum (Pt), nickel (Ni), tin (Sn), copper (Cu), tungsten (W), palladium (Pd), titanium (Ti), and alloys thereof. The conductive paste may be printed by a screen-printing method or a gravure printing method, but a printing method of the conductive paste is not limited thereto.

The multilayer ceramic capacitor 200 according to another embodiment may include a first connection electrode 231, a second connection electrode 234, a third connection electrode 232, and a fourth connection electrode 233. In addition, the first and second connection electrodes 231 and 234 may be electrically connected to the first and second external electrodes 241 and 244, and the third and fourth connection electrodes 232 and 233 may be electrically connected to the third and third connection electrodes 242 and 243.

As described above, a plurality of connection electrodes, connecting the first external electrode 241 and the second external electrode 244 to each other and connecting the third external electrode 242 and the fourth external electrode 243 to each other, may be disposed to improve adhesive force between the electrode and the body.

Figure 4:
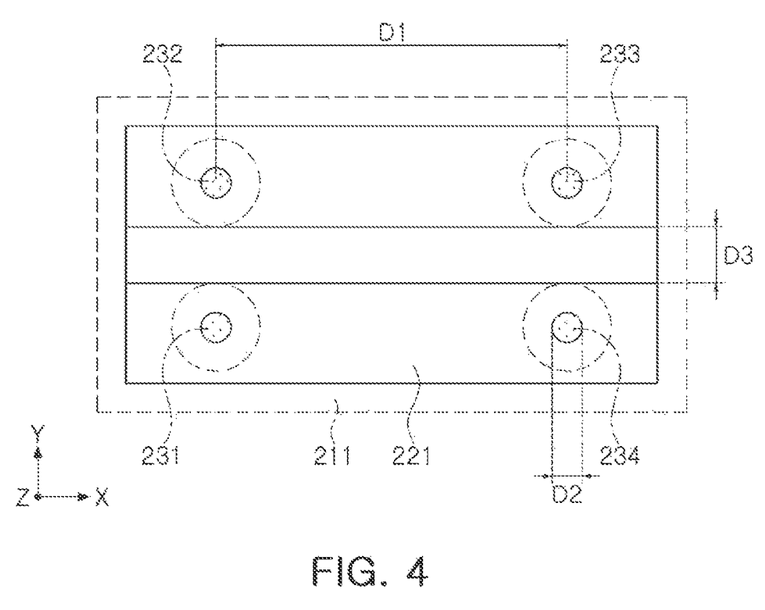
FIG. 4 is a top view of FIG. 1 when viewed in a direction S1.

FIG. 4 illustrates a distance D1 between the first and second connection electrodes 231 and 234 or a distance D1 between of the third and fourth connection electrodes 232 and 233, a diameter D2 of each of the first to fourth connection electrode 231 232, 233, and 234, and a distance D3 between the first via hole and the third via hole or a distance D3 between the second via hole and the fourth via hole.

The distance D1 between the first and second connection electrodes 231 and 234 or an interval D1 between the third and fourth connection electrodes 232 and 233 may be a value measured based on a center of each connection electrode. In addition, the diameter D2 of each of the first to fourth connection electrodes 231, 232, 233, and 234 may refer to a maximum diameter of any one of the connection electrodes. The distance D3 between the first via hole and the third via hole or the distance D3 between the second via hole and the fourth via hole may refer to a shortest distance between the via holes.

Referring to FIG. 4, a ratio of the distance D1 between the first and second connection electrodes 231 and 234 or the distance D1 between the third and fourth connection electrodes 232 and 233 to the distance D3 between the first via hole and the third via hole or the distance D3 between the second via hole and the fourth via hole (D1/D3) may be, for example, 1.90 or more, 1.94 or more, 1.98 or more, 2.02 or more, 2.06 or more, 2.08 or more, or 3.125 or more. When the ratio D1/D3 of the distance D1 between the first and second connection electrodes 231 and 234 to the distance D3 between the first via hole and the third via hole satisfies the above ranges, the equivalent series inductance (ESL) may be reduced. In detail, when the ratio D1/D3 is 3.125 or more, an ESL reduction effect may be significantly improved.

In another embodiment, an upper limit of the ratio D1/D3 may be 5.0 or less. The ratio D1/D3 may be 5.0 or less, 4.9 or less, 4.8 or less, 4.700 or less, 4.695 or less, 4.690 or less, or 4.688 or less, but is not limited thereto. When the ratio D1/D3 satisfies the above ranges, the equivalent series inductance (ESL) may be reduced.

In another embodiment, a ratio of the diameter D2 of each of the first to fourth connection electrodes 231, 232, 233, and 234 to the distance D3 between the first via hole and the third via hole or the distance D3 between the second via hole and the fourth via hole (D2/D3) may be 0.375 or more. The ratio D2/D3 may be 0.375 or more, 0.380 or more, 0.385 or more, 0.390 or more, 0.395 or more, 0.400 or more, 0.405 or more, or 0.410 or more, but is not limited thereto. When the ratio D2/D3 satisfies the above ranges, the equivalent series inductance (ESL) may be reduced. In detail, when the ratio D2/D3 is 0.41 or more, an ESL reduction effect may be significantly improved.

In another embodiment, a ratio of the diameter D2 of each of the first to fourth connection electrodes 231, 232, 233, and 234 to the distance D3 between the first via hole and the third via hole or the distance D3 between the second via hole and the fourth via hole (D2/D3) may be 0.6 or less. The ratio D2/D3 may be 0.60 or less, 0.58 or less, 0.56 or less, 0.54 or less, or 0.52 or less, but is not limited thereto. When the ratio D2/D3 is greater than the above numerical ranges, capacitance of the multilayer ceramic capacitor may be reduced.

Table 1 illustrates ESL characteristics depending on the ratio (D1/D3) of the distance D1 between the first and second connection electrodes 231 and 234 or the distance D1 between the third and fourth connection electrodes 232 and 233 to the distance D3 between the first via hole and the third via hole or the distance D3 between the second via hole and the fourth via hole. A prototype capacitor, having a length of 890 μm, in which a distance D3 between a first via hole and a third via hole or a distance D3 between a second via hole and a fourth via hole was 192 μm, was manufactured, and an average value of 100 prototype capacitors was obtained.

TABLE 1

| D1(um) | D1/D3 | Cap(nF) | ESL(PH) | % |
|---|---|---|---|---|
| 200 | 1.041667 | 0.3 | 53.07 | 100% |
| 400 | 2.083333 | 0.3 | 46.78 | 88% |
| 600 | 3.125 | 0.3 | 42.74 | 81% |

From Table 1, it can be seen that the ESL characteristics are improved as a distance D1 between the connection electrodes is increased, a high ESL reduction is exhibited when D1/D3 is 2.08, and an ESL reduction effect is further improved when D1/D3 is 3.125.

Table 2 illustrates ESL characteristics depending on the ratio of the diameter D2 of each of the first to fourth connection electrodes 231, 232, 233, and 234 to the distance D3 between the first via hole and the third via hole or the distance D3 between the second via hole and the fourth via hole (D2/D3). A prototype capacitor, having a length of 890 μm, in which a distance D3 between a first via hole and a third via hole or a distance D3 between a second via hole and a fourth via hole was 192 μm and a distance D1 between the first and second connection electrodes 231 and 234 or a distance between the third and fourth connection electrodes 232 and 233 is 600 μm, was manufactured, and an average value of 100 prototype capacitors was obtained.

TABLE 2

| D2(um) | D2/D3 | Cap.[uF] | ESL(PH) | % |
|---|---|---|---|---|
| 72 | 0.375 | 0.31 | 67.64 | 100% |
| 80 | 0.416667 | 0.31 | 36.01 | 96% |
| 96 | 0.5 | 0.28 | 34.03 | 90% |

From Table 2, it can be seen that ESL characteristics are improved as a diameter D2 of the connection electrode is increased, ESL reduction is exhibited since D2/D3 is greater than 0.375, and an ESL reduction effect is further improved when D2/D3 is 0.5.

In an example, the connection electrodes 231, 232, 233, and 234 may include nickel (Ni) in highest content, but a material of the connection electrodes 231, 232, 233, and 234 is not limited thereto. For example, the connection electrodes 231, 232, 233, and 234 may be formed using a conductive paste including at least one of silver (Ag), palladium (Pd), gold (Au), of nickel (Ni), tin (Sn), copper (Cu), tungsten (W), palladium (Pd), titanium (Ti), and alloys thereof. A method of forming the connection electrodes 231, 232, 233, and 234 is not limited. For example, the connection electrodes 231, 232, 233, and 234 may be formed by forming a laminate in which the first and second internal electrodes 221 and 222 are laminated, penetrating the body 210 in a third direction (a Z direction) using laser drilling, mechanical pin punching, or the like to form through-holes in the body 210, and filling the conductive paste in holes in the through-holes in the body 210.

In an example, the internal electrodes 221 and 222 and the connection electrodes 231, 232, 233, and 234 may include the same metal material. The same metal material may be nickel (Ni), but is not limited thereto. For example, the same metal material may be silver (Ag), palladium (Pd), gold (Au), platinum (Pt), nickel (Ni), copper (Cu), tungsten (W), palladium (Pd), titanium (Ti), and alloys thereof. In the case in which the internal electrodes 121 and 122 and the connection electrodes 231, 232, 233, and 234 of the multilayer ceramic capacitor include the same metal material, a sintering initiation temperature and/or a sintering shrinkage ratio may be matched to prevent cracking, delamination, or the like from occurring.

In an embodiment, the connection electrodes 231, 232, 233, and 234 may protrude from the body 210 in the Z direction. Referring to FIG. 2, the first and second connection electrodes 231 and 234 may protrude from the second surface of the body 210, which is a phenomenon in which the first and second connection electrodes 231 and 234 are pushed out to the outside of a through-hole of the body 210 due to sintering shrinkage, or the like, during formation of the through-hole. In this case, the first connection electrode 231 and the second connection electrode 234 may each have an end portion penetrate into a first sintered electrode 241a of the first external electrode, and a second sintered electrode 244a of the second external electrode 244 may fill portions of the through-holes in the body 210 to contact with other end portions of the first connection electrode 231 and the second connection electrode 234. Similarly, the third connection electrode 232 and the fourth connection electrode 233 may each have an end portion penetrate into a third sintered electrode 242a of the third external electrode, and a fourth sintered electrode 243a of the fourth external electrode 243 may fill portions of the through-holes in the body 210 to contact with other end portions of the third connection electrode 232 and the fourth connection electrode 233. Since delamination of the connection electrode occurs depending on a size of the protrusion during inside or surface mounting of the substrate, adhesive strength may be reduced. In the multilayer ceramic capacitor according to the present disclosure, external electrodes may be formed on both first and second surfaces of the body to prevent the fixing force from being deteriorated by the protrusion.

According to an embodiment, the first to fourth external electrodes 241, 242, 243, and 244 may be disposed on both external surfaces of the body 210. For example, the first and second external electrodes 241 and 244 may be respectively disposed on the first external surface S1 and the second surface S2 of the body 210, and may be electrically connected by the first and second connection electrodes 231 and 234 described above. The third and fourth external electrodes 242 and 243 may be spaced apart from the first and second external electrodes 241 and 244 and may be disposed on the first and second external surfaces S1 and S2 of the body 210, and may be electrically connected to each other by the third and fourth connection electrodes 232 and 233 described above.

Hereinafter, a structure of the first external electrode 241 will be described with reference to FIG. 2. The description of the structure of the first external electrode 241 including layers 241a, 241b, and 241c may be applied to the second external electrode 242 including layers 242a, 242b, and 242c, the third external electrode 243 including layers 243a, 243b, and 243c, and the fourth external electrode 244 including 244a, 244b, and 244c in the same manner, unless described explicitly.

Referring to FIG. 2, the first external electrode 241 may include a first sintered electrode 241a and first and second plating layers 241b and 241c. The first sintered electrode 241a may include at least one of silver (Ag), palladium (Pd), gold (Au), platinum (Pt), nickel (Ni), tin (Sn), copper (Cu), tungsten (W), palladium (Pd), titanium (Ti), and alloys thereof. For example, the first sintered electrode 241a may be a sintered electrode formed by sintering a conductive paste including nickel (Ni). Similarly to the first sintered electrode 241, when the external electrode is formed as a sintered electrode, the external electrode may be simultaneously with the body and the internal electrode, and adhesive strength between the body and the external electrode may be further improved.

In an example, centerline average roughness Ra of the surfaces of the first to fourth external electrodes 241, 242, 243, and 244 may range from 1 nm to 100 nm. In the present specification, the "center line average roughness Ra" may refer to an average value of distances to a virtual centerline. An external electrode, having a centerline average roughness Ra ranging from 1 nm to 100 nm, may refer to an external electrode having surface roughness having the above-mentioned range, and may refer to an external electrode having surface roughness artificially formed to satisfy the above-mentioned range.

The centerline average roughness Ra is a value calculated by drawing a virtual centerline for roughness on the surfaces of the first to fourth external electrodes 241, 242, 243, and 244, measuring respective distances (for example, r1, r2, r3, . . . , and rn) based on the virtual centerline of the roughness, and obtaining an average value as given by Equation 1.

$$Ra = \frac{\sum_{1}^{n} r_n}{n}$$

Equation 1

An external electrode, having centerline average roughness Ra satisfying the above range, may be formed by surface modification using a physical or chemical method. The surface modification method is not limited as long as the above-described roughness may be provided. For example, the surface modification method may be surface treatment using an acidic or basic solution or physical polishing using an abrasive.

Generally, an oxide layer is formed on a surface of a sintered electrode including nickel, or the like, in a sintering process. Therefore, it may be difficult to form a plating layer and the plating layer may easily peel off. When the external electrode according to an embodiment is surface-modified to satisfy the centerline average roughness Ra of the above-described range, an oxide layer may be removed or a surface having a predetermined roughness may be formed. Thus, adhesion between the external electrode and the plating layer may be enhanced and the plating layer may be prevented from peeling off.

The first plating layer 241b according to an embodiment may be a plating layer including nickel, and the second plating layer 241b may be a plating layer including copper or tin. The first plating layer 241b may include nickel to improve adhesion to the first sintered electrode 241a. Also, the second plating layer 241b may include copper or tin to form an external electrode with improved conductivity, plating adhesion, and solderability.

In an example, each of the first to fourth external electrodes 241, 242, 243, and 244 may have a thickness ranging from 3 μm to 30 μm. The thickness of each of the first to fourth external electrodes 141, 142, 143, and 144 may refer to the entire thickness of the sintered electrode, the first plating layer, and the second plating layer laminated, and may refer to a vertical distance from the body to the surface of the external electrode. The thickness of the external electrode may be adjusted within the above range to obtain improved mountability without occupying a large space when used for surface mounting or substrate embedding.

A multilayer ceramic capacitor according to the present disclosure may be manufactured by a following method. A body including a dielectric layer and first and second internal electrodes, disposed with a dielectric layer interposed therebetween, may be prepared by laminating a sheet, on which a paste including a conductive metal is printed, on one surface of a ceramic green sheet including a dielectric layer to a predetermined thickness.

A first cover portion 212 and a second cover portion 213 may be formed by laminating dielectric layers, each not including an internal electrode, on upper and lower portions of the body 210.

After the cover portion is formed, a via H is formed in the body 210 using laser drilling or mechanical pin punching. Then, first to fourth connection electrodes 231, 232, 233, and 234 are formed by applying a conductive paste to the via H or filling a conductive material using plating or the like.

Then, first and second external electrodes 241 and 244, connected to the first and second connection electrodes 231 and 234, and third and fourth external electrodes 242 and 243, connected to the third and fourth connection electrodes 232 and 233, may be formed on one surface of the body 210.

More specifically, forming the first to fourth external electrodes 241, 242, 243, and 444 may include forming first to fourth sintered electrodes, each including nickel, on the body 210, forming a first plating layer on each of the first to fourth sintered electrode layers, and forming a second plating layer on each of the first plating layers.

The sintered electrode may be formed by applying a conductive paste, including nickel, and sintering the conductive paste. The first plating layer may include nickel and may be formed by an electrical or chemical plating method. The second plating layer may include copper or tin and may be formed by an electric or chemical plating method.

After a sintered electrode is formed, sintering and plasticization are performed to form the first plating layer and the second plating layer. As a result, the multilayer ceramic capacitor, illustrated in FIG. 1, is completed.

As described above, according to an embodiment, capacitance of a multilayer ceramic capacitor may be improved.

According to another embodiment, a breakdown voltage (BDV) of a multilayer ceramic capacitor may be increased.

According to another embodiment, a multilayer ceramic capacitor, which may improve equivalent series inductance (ESL) due to a mutual inductance cancellation effect, may be provided.

While example embodiments have been shown and described above, it will be apparent to those skilled in the art that modifications and variations could be made without departing from the scope of the present disclosure as defined by the appended claims.

What is claimed is:

1. A multilayer ceramic capacitor comprising:
a body including dielectric layers and first and second internal electrodes disposed with respective dielectric layers interposed therebetween to be point-symmetrical to each other;
first and second connection electrodes penetrating through the body in a direction perpendicular to the dielectric layer, and connected to the first internal electrode;
third and fourth connection electrodes penetrating through the body in the direction perpendicular to the dielectric layer, and connected to the second internal electrode;
first and second external electrodes disposed on both external surfaces of the body and connected to the first and second connection electrodes; and
third and fourth external electrodes spaced apart from the first and second external electrodes and connected to the third and fourth connection electrodes,
wherein the second internal electrode has first and second via holes, and the first internal electrode has third and fourth via holes, and
wherein a ratio of a diameter of one of the first to fourth connection electrodes to a distance between the first via hole and the third via hole or a distance between the second via hole and the fourth via hole is 0.375 or more.

2. The multilayer ceramic capacitor of claim 1, wherein the first and second connection electrodes penetrate through the first and second via holes of the second internal electrode, respectively, and
the third and fourth connection electrodes penetrate through the third and fourth via holes of the first internal electrode, respectively.

3. The multilayer ceramic capacitor of claim 1, wherein each of the first and second internal electrodes has a rectangular shape.

4. The multilayer ceramic capacitor of claim 1, wherein a ratio of a distance between the first and second connection electrodes or a distance between the third and fourth connection electrodes to a distance between the first via hole and the third via hole or a distance between the second via hole and the fourth via hole is 1.9 or more.

5. The multilayer ceramic capacitor of claim 4, wherein the distance between the first and second connection electrodes is a distance between centers of the first and second connection electrodes,
the distance between the third and fourth connection electrodes is a distance between centers of the third and fourth connection electrodes,
the distance between the first via hole and the third via hole is a shortest distance between the first via hole and the third via hole, and
the distance between the second via hole and the fourth via hole is a shortest distance between the second via hole and the fourth via hole.

6. The multilayer ceramic capacitor of claim 1, wherein a ratio of a distance between the first and second connection electrodes or a distance between the third and fourth connection electrodes to a distance between the first via hole and the third via hole or a distance between the second via hole and the fourth via hole is 5.0 or less.

7. The multilayer ceramic capacitor of claim 6, wherein the distance between the first and second connection electrodes is a distance between centers of the first and second connection electrodes,
the distance between the third and fourth connection electrodes is a distance between centers of the third and fourth connection electrodes,
the distance between the first via hole and the third via hole is a shortest distance between the first via hole and the third via hole, and
the distance between the second via hole and the fourth via hole is a shortest distance between the second via hole and the fourth via hole.

8. The multilayer ceramic capacitor of claim 1, wherein the distance between the first via hole and the third via hole is a shortest distance between the first via hole and the third via hole, and
the distance between the second via hole and the fourth via hole is a shortest distance between the second via hole and the fourth via hole.

9. The multilayer ceramic capacitor of claim 1, wherein the ratio of a diameter of one of the first to fourth connection electrodes to a distance between the first via hole and the third via hole or a distance between the second via hole and the fourth via hole is 0.6 or less.

10. The multilayer ceramic capacitor of claim 9, wherein the distance between the first via hole and the third via hole is a shortest distance between the first via hole and the third via hole, and
the distance between the second via hole and the fourth via hole is a shortest distance between the second via hole and the fourth via hole.

11. The multilayer ceramic capacitor of claim 1, wherein each of the first and second internal electrodes includes nickel.

12. The multilayer ceramic capacitor of claim 1, wherein each of the first to fourth external electrodes is a sintered electrode including nickel.

13. The multilayer ceramic capacitor of claim 1, wherein each of the first to fourth external electrodes has centerline average roughness ranging from 1 nm to 100 nm.

14. The multilayer ceramic capacitor of claim 1, wherein each of the first to fourth external electrodes includes a sintered electrode, and a first plating layer and a second plating layer laminated sequentially on the sintered electrode.

15. The multilayer ceramic capacitor of claim 1, wherein each of the first to fourth external electrodes has a thickness ranging from 1 μm to 10 μm.

16. The multilayer ceramic capacitor of claim 1, wherein the body has a thickness of 100 μm or less.

17. A multilayer ceramic capacitor comprising:
a body including dielectric layers and first and second internal electrodes disposed with respective dielectric layers interposed therebetween;
first and second connection electrodes penetrating through the body in a direction perpendicular to the dielectric layer, and connected to the first internal electrode;
third and fourth connection electrodes penetrating through the body in the direction perpendicular to the dielectric layer, and connected to the second internal electrode;
a first external electrode disposed on one external surface of the body and connected to the first internal electrode through the first and second connection electrodes; and
a third external electrode disposed on the one external surface of the body and connected to the second internal electrode through the third and fourth connection electrodes,
wherein the second internal electrode has first and second via holes in which the first and second connection electrodes are respectively disposed, and the first internal electrode has third and fourth via holes in which the third and fourth connection electrodes are respectively disposed, and
a ratio of a diameter of one of the first to fourth connection electrodes to a distance between the first via hole and the third via hole or a distance between the second via hole and the fourth via hole is 0.375 or more and 0.52 or less.

18. The multilayer ceramic capacitor of claim 17, further comprising:
a second external electrode disposed on another external surface of the body opposing the one surface, and connected to the first internal electrode through the first and second connection electrodes; and
a fourth external electrode disposed on the another external surface of the body, and connected to the second internal electrode through the third and fourth connection electrodes.

19. A multilayer ceramic capacitor comprising:
a body including dielectric layers and first and second internal electrodes disposed with respective dielectric layers interposed therebetween to be point-symmetrical to each other;
first and second connection electrodes penetrating through the body in a direction perpendicular to the dielectric layer, and connected to the first internal electrode;
third and fourth connection electrodes penetrating through the body in the direction perpendicular to the dielectric layer, and connected to the second internal electrode;
first and second external electrodes disposed on both external surfaces of the body and connected to the first and second connection electrodes; and
third and fourth external electrodes spaced apart from the first and second external electrodes and connected to the third and fourth connection electrodes,
wherein the second internal electrode has first and second via holes, and the first internal electrode has third and fourth via holes, and
wherein a ratio of a distance between the first and second connection electrodes or a distance between the third and fourth connection electrodes to a distance between the first via hole and the third via hole or a distance between the second via hole and the fourth via hole is 1.9 or more.

* * * * *